Sept. 20, 1966     L. F. DONNELLY ETAL     3,273,385

BRAKE TESTING APPARATUS

Filed March 10, 1964

INVENTORS
LEO F. DONNELLY
ALVIN M. FISCHER
FRANKLIN R. NAIL
BY

THEIR ATTORNEYS

3,273,385
BRAKE TESTING APPARATUS
Leo F. Donnelly, Alvin M. Fischer, and Franklin R. Nail, Allentown, Pa., assignors to Mack Trucks, Inc., Plainfield, N.J., a corporation of New York
Filed Mar. 10, 1964, Ser. No. 350,758
6 Claims. (Cl. 73—129)

This invention relates to improvements in automotive test equipment and more particularly to an improved apparatus for measuring the horsepower rating of vehicle brakes and the like under actual road conditions.

Known forms of brake testing apparatus are suitable only for bench testing. These devices apply artificial brake loadings to a wheel mounted on a shaft or axle secured to a test stand. A torque arm on the shaft is engaged by a counterbalancing transmission lever which measures the brake torque. These devices do not measure vehicle brake torque under actual road or field conditions and thus fail to satisfy completely the needs of the automotive industry.

In accordance with the present invention, there is provided a vehicle undercarriage for measuring the horsepower rating of brakes or braking effect comprising a transversely disposed axle and a pair of trunnions adapted to rotatably suspend the axle below the vehicle. Suitable automotive wheels, mounted for rotation on the transverse extremities of the axle, are adapted to stress the axle through automotive brakes of conventional design by selectively interposing the brakes between the axle and the wheels. At least one torque arm perpendicular to the center line of the axle is clamped to the center portion of the rotatably mounted axle and is braced against the vehicle frame to prevent the axle, brake and wheels from rotating together when the brakes are applied. The torque arm bears a force proportional to the retarding torque of the braking action. The stresses thus established in the torque arm are measured and recorded by conventional strain gauges and the like, to provide an accurate means of maintaining a desired torque level at the brakes.

More particularly, the torque arm can be disposed to bridge between the rotatable axle, to which the torque arm is clamped, and a portion of the vehicle frame, such as a transverse frame member, against which the uppermost end of the torque arm is braced. The stress measuring means as for example, strain gauges, associated with the torque arm can be connected to a conventional strain gauge bridge for stress recording purposes.

For a more complete understanding of the present invention, reference may be had to the accompanying drawings in which.

Figure 1:
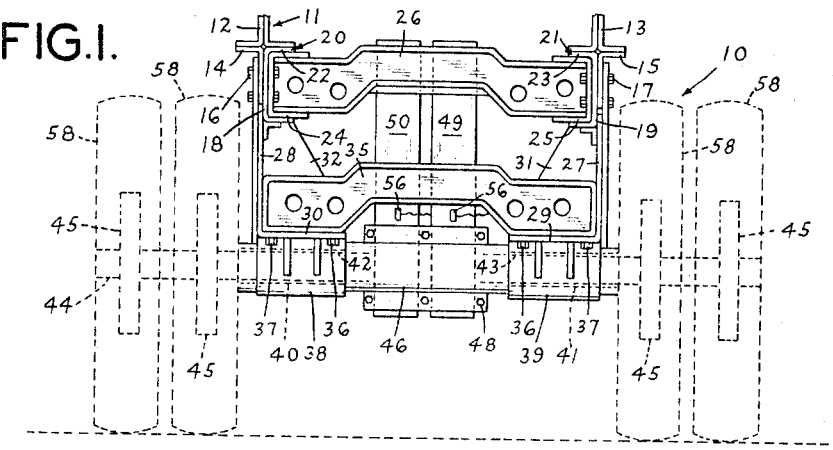
FIGURE 1 is a front elevation of a vehicle undercarriage embodying the invention.
Figure 2:
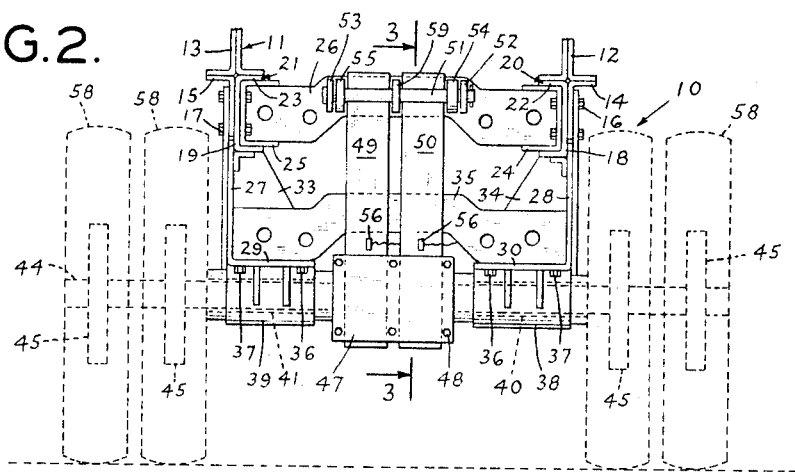
FIGURE 2 is a rear elevation of the vehicle undercarriage shown in FIGURE 1.

An undercarriage or frame 10, is attached to a conventional automotive trailer 11 or the like by welding or similarly fastening the undercarriage 10 to a pair of longitudinal frame members 12 and 13 conveniently shown in FIGURES 1 and 2 as conventional wide-flange or I-beams. The undercarriage 10 is secured to the trailer frame members 12 and 13 by a pair of inverted longitudinal angle members 14 and 15. The horizontally disposed short legs of the angle members 14 and 15 are arranged outwardly in opposite directions and are each in contact with the respective lower flanges of the frame members 12 and 13.

The downwardly depending lower legs of the angle members 14 and 15 are secured by fasteners 16 and 17 each respectively to vertical web portions 18 and 19 on respective longitudinal channel members 20 and 21 each having inwardly disposed bights. The uppermost flanges 22 and 23 of the channel members 20 and 21 are also in contact with the lower flanges of the frame members 12 and 13. Gusset members 24 and 25 received within the bights of the respective channel members 20 and 21 are secured by the fasteners 16 and 17 to provide two rigid assemblies of angle members 14, 15, channel members 20 and 21, and gusset members 24 and 25.

An upper transverse bar 26 interconnects the bights of the oppositely disposed gusset members 24 and 25 which are each connected to the respective frame members 12 and 13 through the angle and channel member structures previously described. In accordance with good industrial practice, the upper transverse bar 26 may be perforated to reduce the weight of the bar and save metal without significantly impairing the strength of the bar 26.

Trunnion brackets 27 and 28, depending from the respective angle members 14 and 15, and channel members 20 and 21 assemblies are each provided with inwardly and horizontally disposed transverse legs 29 and 30. Transversely disposed rearward plates 31 and 32 (FIGURE 1) are welded, or similarly fastened to the rearward edge of the respective trunnion brackets 27 and 28. Forward transverse gusset plates 33 and 34 (FIGURE 2), attached to the forward edge of the respective trunnion brackets 27 and 28, cooperatively form with the rearward plates 31 and 32, a pair of housings between the trunnion brackets 27 and 28.

A lower transverse bar 35, of construction similar to that of the upper transverse bar 26, is interposed between the lower extremities of the depending trunnion brackets 27 and 28. The transverse extremities of the bar 35 are each nested in the housings formed by the respective trunnion brackets 27 and 28 and the gusset plates 31 and 32, 33 and 34 in the manner hereinbefore described. Fasteners 36 and 37 secure the extremities of the lower transverse bar 35 to the transverse legs 29 and 30 of the trunnion brackets 27 and 28.

The trunnion brackets 27 and 28 are provided with respective depending trunnions 39 and 38 each having a mutually aligned transverse aperture 40, 41. Advantageously, anti-friction bearings 42 and 43 are accommodated within the respective apertures 40 and 41.

A transversely disposed axle 44 is received within the anti-friction bearings 42 and 43 for substantially friction-free rotation. The axle is thus suspended by the trunnions 38 and 39 and the trunnion brackets 27 and 28 from the undercarriage 10 of the vehicle 11.

Automotive brakes 45 to be tested, of any type that will convert kinetic energy to heat, such as drum-and-shoe type brakes, disc brakes, cone brakes, or prony brakes, are provided at the transverse extremities of the axle 44. When the brakes are applied to selectively resist the rotation of the wheels 58, the axle 44 will try to turn as a single unit within the bearings 42 and 43 mounted in the trunnions 38 and 39.

Figure 3:
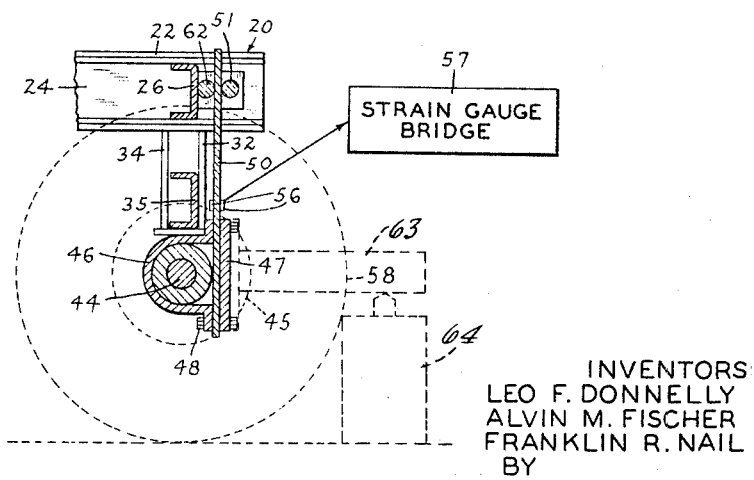
FIGURE 3 is a side view in section of the undercarriage shown in FIGURE 2, taken along the line 3—3, and looking in the direction of the arrows.

A C-shaped strap or clamp 46 (FIGURES 1 and 3), centrally disposed on the forward periphery of the axle 44 between the trunnions 38 and 39 is provided with a bight snugly engaging around a portion of the axle periphery so that the bight of the C-shaped clamp 46 is oriented toward the rear of the vehicle 11. A vertically disposed flat clamping plate 47 is seated over and closes off the open bight of the C-shaped clamp 46. fasteners 48, the clamping plate 47, and the C-shaped clamp 46 together lock the clamp 46 firmly to the central portion of the axle 44.

Interposed between the C-shaped clamp 46 and clamping plate 47 are the lower extremities of vertically disposed torque arms 49 and 50. The clamping plate 47, drawn by the fasteners 48 and the C-shaped clamp 46 clamps the torque arms 49 and 50 to the rotatable axle 44 so that the torque arms 49 and 50 are fixed to the axle 44 and provide a lever arm through which rotation is resisted.

The upper extremities of the vertically arranged torque arms 49 and 50 are braced by a horizontal, transverse retaining member 51 against a spacing bar 62 (FIGURE 3) on the upper transverse bar 26. The spacing bar 62 may have a round shape to provide line contact with the torque arms 49 and 50, regardless of any deflection that may take place within the torque arm. The retaining member 51 conveniently shown as a stiff bar of metal or the like (FIGURES 2 and 3) is supported in brackets 52, 53 and 59 transversely arranged on the central portion of the upper transverse bar 26 and welded or similarly fixed thereto. The upper portions of the torque arms 49 and 50 are thus interposed between the spacing bar 62 and the member 51. Cylindrical spacers 54 and 55 are received on the retaining member 51 and disposed between the sides of the torque arms 49 and 50 respectively and the brackets 52 and 53 to properly align and prevent any transverse movement of the torque arms 49 and 50 relative to the member 51 and bar 62. Thus the torque arms 49 and 50 vertically bridge between the axle 44 and the upper transverse bar 26 and, in cooperation with the C-shaped clamp 46, clamping plate 47 and fasteners 48, resiliently restrain the axle 44 against rotational movement.

Strain gauges 56 of conventional design are secured to the torque arms 49 and 50 in the usual manner familiar to those skilled in the art to sense the stresses imposed on the torque arms 49 and 50 in a manner to be hereinafter described. A conventional strain gauge bridge 57 is provided to record stresses sensed by the strain gauges 56 in the torque arms 49 and 50.

In operation, when the vehicle 11 is in motion the uppermost ends of the torque arms 49 and 50, interposed between the bar 62 and the member 51 and fixed at their lower ends to the axle 44, prevent the axle 44 from rotating in the bearings 42 and 43. The brakes, having brake shoes fixed to the extremities of the axle, are applied to engage the brake drums within the rotating wheels 58. The braking force is applied to the wheel in this conventional manner to resist or arrest rotation of the wheels 58. The wheels 58, frictionally engaged by the brake shoes, apply a torsional force to the axle 44 tending to cause the axle 44 to rotate. The torsional stress imposed on the axle 44 by the brakes 45 is a function of the braking power and is transmitted directly to the torque arms 49 and 50.

The stress established in the torque arms 49 and 50 is sensed by the strain gauges 56 affixed to the torque arms 49 and 50 in a conventional manner. The strain gauge bridge 57 reflects the stress sensed by the strain gauges 56 for recording and subsequent interpretation in terms of horespower absorbed by the brakes in the manner well known in the art.

A removable lever 63 (shown in dotted lines), clamped to and extending rearward from the axle 44 center section (FIGURE 3), can be provided for calibration purposes. The removable lever is loaded to a predetermined value by a conventional load cell 64, which may be hydraulic, or mechanical or the like, to calibrate the strain gauges 56 and the strain gauge bridge 57 to some fixed standard to which test data can be compared. The strain gauges 56 and the strain gauge bridge 57 thus calibrated provide accurate torque.

With an arbitrary, but constant, value of braking torque maintained at the axle 44, the trailer 11 is drawn by a tractor (not shown) at a constant road speed for twelve minutes. At the end of the twelve minute period, according to one application of the invention, the vehicle is stopped with a conventional air brake chamber pressure of 108 pounds per square inch. If the stopping distance, corrected for the GCW of the test rig compared to the test axle rating is 42 feet, the horsepower rating of the brakes is equal to a constant times the braking torque times the wheel speed in revolutions per minute. If the terminal stopping distance is greater or less than 42 feet, the test must be repeated at a new torque level that will yield a terminal stopping distance equivalent to 42 feet for the specific tractor-trailer rig.

As is apparent from the foregoing, the present invention provides an apparatus for the measurement of brake effectiveness under actual field conditions.

While a representative embodiment of the present invention has been shown and described for purposes of illustration, various changes and modifications may be made therein as pointed out above without departing from the principles of this invention. Therefore, all such changes and modifications are included within the intended scope of the invention as defined by the following claims.

We claim:

1. A device for measuring the horespower rating of vehicle brakes comprising a frame, an axle, means for rotatably supporting said axle on said frame wheels rotatably mounted on said axle for rotation thereon, brake means operatively fixed to said axle for selective engagement with said wheels to resist the rotation thereof, at least one torque arm operatively fixed to said transverse axle and secured to said frame to oppose axle rotation, and means for measuring stresses developed in said torque arm to measure the horsepower absorbed by the brake means when said brake means are engaged with the wheels.

2. A device for measuring the horsepower rating of vehicle brakes, comprising a frame, spaced trunnions depending from the frame each having an aperture therein, an axle adapted to be rotatably received within said trunnion apertures, wheels rotatably mounted on said axle for rotation thereon, brake means operatively fixed to said axle for selective engagement with said wheels to resist the rotation thereof, at least one torque arm fixed to said rotatable axle and secured to said frame to oppose axle rotation, and means for measuring stresses developed in said torque arm to measure the horsepower absorbed by the brake means when said brake means are engaged with the wheels.

3. A device for measuring the rating of vehicle brakes, comprising a frame, spaced trunnions depending from the frame each having an aperture therein, an axle adapted to be rotatably received within said trunnion apertures, wheels rotatably mounted on said axle for rotation thereon, brake means operatively fixed to said axle for selective engagement with said wheels to resist the rotation thereof, a clamp adapted to be centrally disposed on said axle between said trunnions, at least one torque arm fixed to said clamp and secured to said frame to oppose axle rotation, and means for measuring stresses developed in said torque arm to measure the horsepower absorbed by the brake means when said brake means are engaged with the wheels.

4. A device according to claim 3 wherein said means for measuring stresses includes a strain gauge bridge.

5. A device according to claim 3 including means for selectively stressing said torque arm with a known torque for calibrating said means for measuring stresses.

6. A drive according to claim 5 wherein said means for selectively stressing said torque arm is a removable lever adapted to be clamped to said axle.

References Cited by the Examiner

UNITED STATES PATENTS 2,063,244  12/1936  Gulliver _____ 73—129
2,403,952  7/1946   Ruge _____ 73—136

RICHARD C. QUEISSER, *Primary Examiner.*

J. W. MYRACLE, *Assistant Examiner.*